United States Patent [19]

Gray et al.

[11] Patent Number: 5,621,594
[45] Date of Patent: Apr. 15, 1997

[54] ELECTROPLATED THIN FILM CONDUCTOR COIL ASSEMBLY

[75] Inventors: G. Robert Gray, Fremont; Arun Malhotra, San Jose, both of Calif.

[73] Assignee: AIWA Research and Development, Inc., Fremont, Calif.

[21] Appl. No.: 390,470

[22] Filed: Feb. 17, 1995

[51] Int. Cl.$^6$ ........................................... G11B 5/17
[52] U.S. Cl. ........................................ 360/123; 360/126
[58] Field of Search ................................. 360/123, 122, 360/126

[56] References Cited

U.S. PATENT DOCUMENTS

| | | | |
|---|---|---|---|
| 3,662,119 | 5/1972 | Romankiw et al. | 179/100.2 C |
| 3,723,665 | 3/1973 | Lazzari et al. | 179/100.2 C |
| 4,251,910 | 2/1981 | Griffith | 29/603 |
| 4,639,289 | 1/1987 | Lazzari | 156/643 |
| 4,829,659 | 5/1989 | Deroux-Dauphin | 29/603 |
| 4,933,209 | 6/1990 | Anthony et al. | 360/123 X |
| 4,949,207 | 8/1990 | Lazzari | 360/119 |
| 4,992,897 | 2/1991 | Deroux-Dauphin | 360/126 X |
| 5,022,141 | 6/1991 | Nagata et al. | 360/123 X |
| 5,059,278 | 10/1991 | Cohen et al. | 360/123 X |
| 5,065,271 | 11/1991 | Matsuura et al. | 360/126 |
| 5,090,111 | 2/1992 | Lazzari | 29/603 |
| 5,163,218 | 11/1992 | Hamilton | 29/603 |
| 5,166,845 | 11/1992 | Thompson et al. | 360/103 |
| 5,260,845 | 11/1993 | Takayama et al. | 360/103 |
| 5,274,521 | 12/1993 | Miyauchi et al. | 360/119 |
| 5,408,373 | 4/1995 | Bajorek et al. | 360/126 X |
| 5,465,475 | 11/1995 | Kinoshita et al. | 360/123 X |

FOREIGN PATENT DOCUMENTS

| | | |
|---|---|---|
| 269489 | 6/1988 | European Pat. Off. . |
| 4117878 | 12/1991 | Germany . |
| WOA8900327 | 1/1989 | WIPO . |

OTHER PUBLICATIONS

A. Sano, M. Egawa, M. Nitta, K. Takayanagi, T. Matsushita, and T. Fujita, A *Low Inductance Metal–In–Gap Head Using a Side–Core Concept*, IEEE Transactions on Magnetics, vol. 29, No. 6, Nov. 1993, pp. 3888–3890.

IBM Technical Disclosure Bulletin, vol. 37, No. 12, Dec. 1994, Armonk, N.Y., US, pp. 77–79, "Thin Film Type Laminated Head".

Patent Abstracts of Japan, vol. 170 (P–373), 16 Jul. 1985 & JP-A-60-045931 (Hitachi Seisakusho KK), 12 Mar. 1985.

Patent Abstracts of Japan, vol. 9, No. 314 (P–412), 10 Dec. 1985 & JP-A-60-145512 (Suwa Sekosha KK), 1 Aug. 1985.

Patent Abstracts of Japan, vol. 13, No. 322 (P–902), 20 Jul. 1989 & JP-A-01-088911 (Hitachi Ltd.) 3 Apr. 1989.

Patent Abstracts of Japan, vol. 5, No. 150 (P–081), 22 Sep. 1981 & JP-A-56-083689 (Fujitsu Ltd), 8 Jul. 1981.

*Primary Examiner*—John H. Wolff
*Attorney, Agent, or Firm*—Skjerven, Morrill, MacPherson, Franklin & Friel

[57] ABSTRACT

A thin film helical conductor coil assembly includes an electrically-nonconducting ceramic substrate having a substantially planar surface and separated first and second magnetic elements which mutually bound a volume of the ceramic substrate. The thin film conductor coil assembly also includes a thin film magnetic core, which magnetically connects the first magnetic element to the second magnetic element. The thin film magnetic core, which overlies the substantially planar surface of the ceramic substrate, is constructed from a compliant electroplated magnetic material. The thin film conductor coil assembly further includes an electroplated thin film helical coil which traverses about the thin film magnetic core and forms a conductive path from a first terminal to a second terminal.

16 Claims, 6 Drawing Sheets

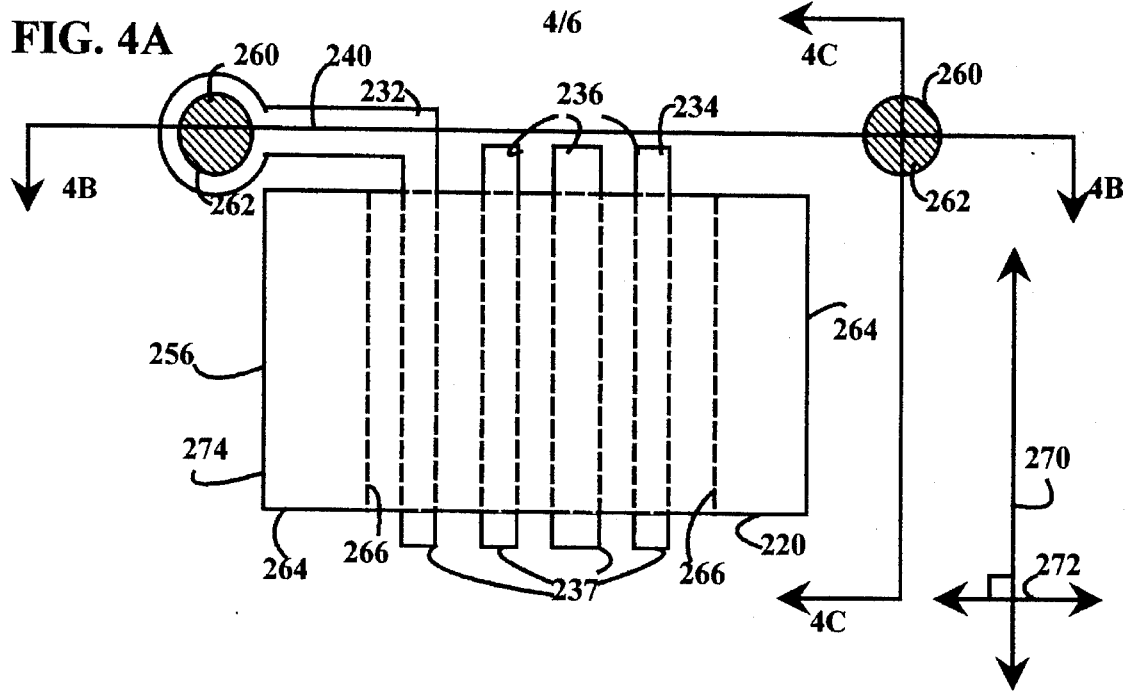
FIG. 4A
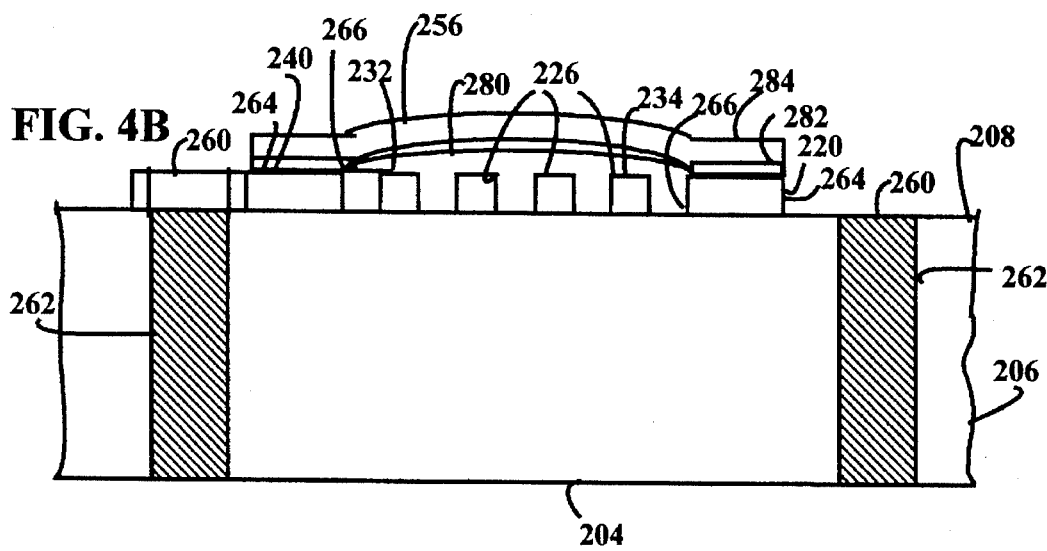
FIG. 4B
FIG. 4C

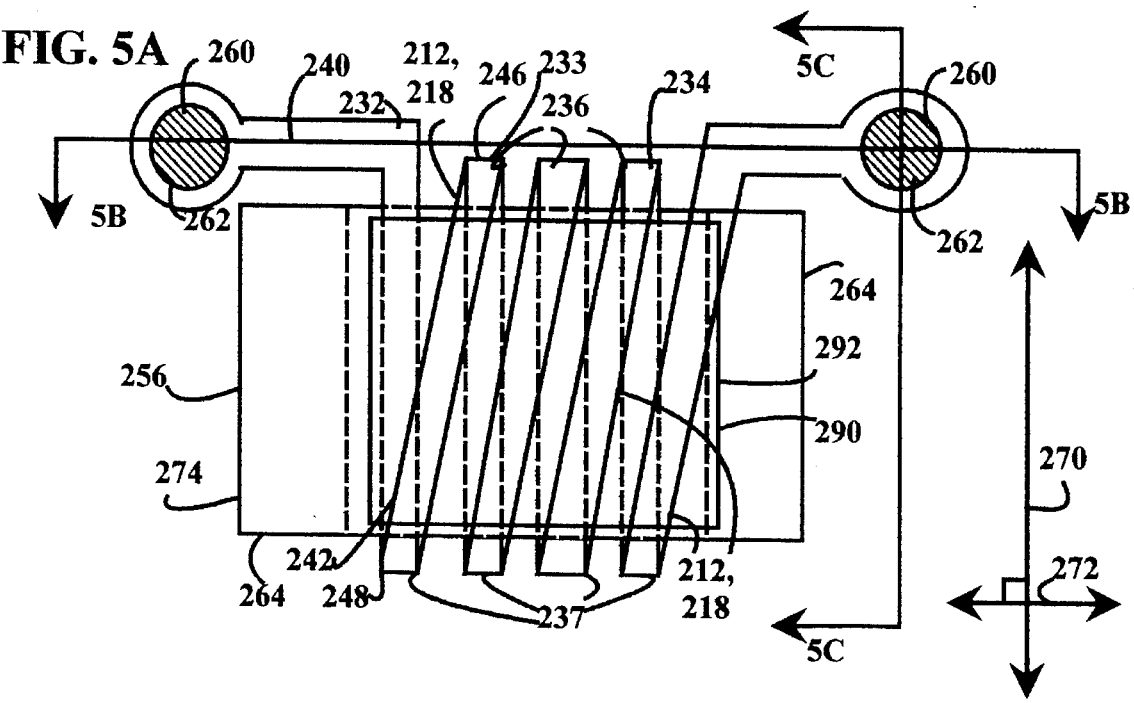
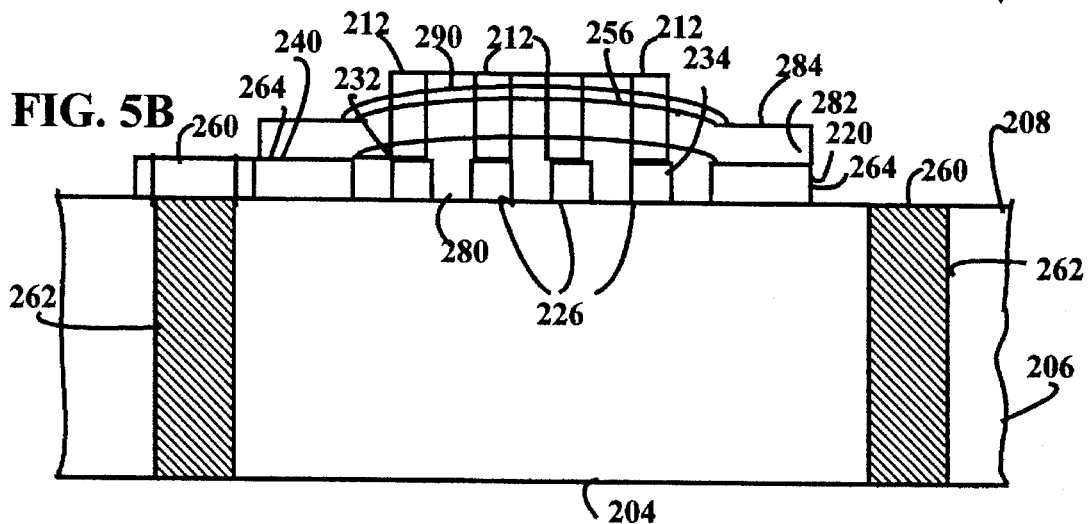
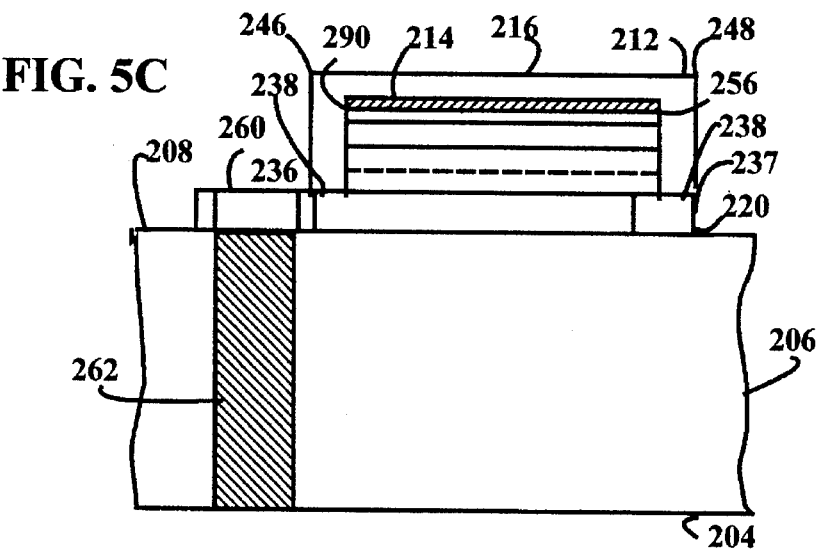

ELECTROPLATED THIN FILM CONDUCTOR COIL ASSEMBLY

CROSS REFERENCE TO RELATED PATENT APPLICATIONS

This patent application is related to the copending patent application U.S. Ser. No. 08/390,345 entitled THIN FILM HELICAL COIL HEAD ASSEMBLY, (Attorney Docket No. M-3095 US) by Gray et al., filed concurrently herewith and assigned to the same assignee, the disclosure of which is incorporated herein by reference.

BACKGROUND OF THE INVENTION

Field of the Invention

The invention relates to magnetic recording heads, and more particularly, to a thin film magnetic core and coil apparatus and method of fabrication.

Description of Related Art

Miniaturization of magnetic recording devices and media has proceeded apace with the brisk diminution of computing devices and electronic circuits in general. A technological problem which has arisen with respect to the downsizing of magnetic recording devices concerns the reduced size of a magnetic recording head. As the size of magnetic recording heads has been reduced, the reading and writing sensitivity has decreased. Furthermore, a reduced size has made fabrication of the recording heads difficult. A magnetic recording head includes a infinitesimal magnetic coil which is wound around a tiny magnetic core. Typically, the magnetic coil is wound around the core by hand in an exceedingly delicate and time consuming operation.

Recently, a thin-film semiconductor fabrication technique has been used to construct magnetic coils for miniature magnetic recording heads. For example, A. Takayama et at. in U.S. Pat. No. 5,260,845, entitled "Magnetic Head Having a Thin Film Conductor Coil Assembly Formed Separate From a Magnetic Head Core", issued on Nov. 9, 1993, discusses a process for fabricating a thin film core. The fabrication process involves processing steps for forming seven layers, including a first insulating layer which is applied on a substrate, a lower coil layer, a second insulating layer, a magnetic core layer, a third insulating layer, an upper coil layer and a protective layer. The second insulating layer isolates the lower coil layer from the magnetic core layer. The third insulating layer isolates the upper coil layer from the magnetic core layer. The substrate is constructed from a ferrite block having grooves which are filled with glass. A dry etching process is used to construct the upper and lower coil layers and the magnetic coil layer, as well as for creating patterns in the insulating and protective layers. The magnetic coil and magnetic core layers are deposited by sputtering in argon gas, which is introduced into a sputtering chamber at a pressure typically between 2 milliTor and 20 milliTor, and are etched using a photoresist mask and ion beam milling. The magnetic coil layer is deposited by sputtering nickel-iron (81%–19%) permalloy to a thickness of 4 microns. The insulating layers are constructed of a thermosetted polyamide resin.

The performance of magnetic coils constructed using thin-film techniques is typically inferior to the performance of heads fabricated manually. Furthermore, the ferrite substrate is limited by present technological considerations to a 2×2 inch square block which is not a standard shape or material for semiconductor processing. The 2×2 inch square yields approximately 2500 units. Both the ferrite and glass materials in the composite substrate are inherently hard, noncompliant materials. Consequently, the surface at which the ferrite-glass substrate contacts overlying layers must be ground perfectly flat otherwise a gap may form between the magnetic materials, increasing the reluctance of the magnetic path and reducing the efficiency of the magnetic recording head.

SUMMARY OF THE INVENTION

Advantageously, the present invention furnishes an improved process for fabricating thin film magnetic recording heads which increases the yield and performance of the heads.

The present invention advantageously supplies an improved process using semiconductor fabrication techniques for constructing thin film magnetic coils which enormously increases the yield of such coils over the conventional manufacturing technique of hand winding of the coils.

Advantageously, the present invention furnishes an improved process for fabricating thin film magnetic recording heads which utilizes electroplating and wet etch processing for fabricating magnetic coils. Substantial improvements are thereby gained in yield and performance of the recording heads over conventional sputter-deposition and dry etch processing techniques.

The present invention also supplies a thin film magnetic recording head having an improved magnetic core and coil for generating an improved-fidelity output signal.

The present invention offers further advantages by utilizing a thick photoresist layer as an insulating material and curing the photoresist using an electron beam curing process. Substantial improvements in yield and productivity are achieved in comparison to conventional usage of a thin photoresist layer and conventional curing of the photoresist using a high temperature baking process.

These and other advantages are achieved in an embodiment of a thin film conductor coil assembly which includes a substantially planar magnetic core and an electroplated thin film conductor coil coiled about and enveloping the magnetic core. The thin film conductor coil includes a first patterned coil layer formed from a plurality of mutually detached and substantially planar first coil layer elements, a second patterned coil layer formed from a plurality of mutually detached substantially planar second coil layer elements, and a plurality of coil segments. The first patterned coil layer is substantially planar in a plane parallel to the planar magnetic core. The first coil layer elements have a first end and a second end. The second coil layer is formed in a plane substantially parallel to the planar magnetic core and separated from the first patterned coil layer plane by the planar magnetic core. The second coil layer elements have a first end and a second end.

The plurality of coil segments connect the first ends of elements of the first coil layer to the first ends of elements of the second coil layer and connect the second ends of elements of the first coil layer to the second ends of elements of the second coil layer. The first coil layer elements are connected to different second coil layer elements at the first and second ends so that the first and second coil layer elements are connected in an alternating sequence having a first end and a second end.

The thin film conductor coil assembly further includes an insulating layer formed about the magnetic core and between the coil segments, the second coil layer elements, and the first coil layer elements so that the magnetic core and the coil layer elements and segments are mutually insulated. A ceramic substrate is connected to the thin film conductor coil and has a substantially planar first surface and an opposing second surface with a plurality of conductive material filled vias passing from the first surface to the second surface of the ceramic substrate to form a conducting pathway across the ceramic substrate. The vias are connected to the first and second ends of the alternating sequence.

Additional advantages are achieved in a second embodiment of a method for fabricating a thin film conductor coil assembly including the steps of forming a first conductive metal via and a second conductive metal via in a ceramic substrate, and electroplating and etching a magnetic coil and a magnetic core. The magnetic coil is electroplated and etched in a first magnetic coil layer overlying a surface of the ceramic substrate and a second magnetic coil layer. Each magnetic coil layer has a lead line connected to one of the first and second metal vias and multiple mutually-isolated coil lines. One coil line in each layer is connected to the lead line and to a coil line of the other magnetic coil layer. Other coil lines in each layer are connected to two coil lines of the other magnetic coil layer so that the first and second coil layers form a serial path from the first metal via to the second metal via. The magnetic core layer is electroplated in a layer between the first and second magnetic coil layers spanning and substantially orthogonal to the coil lines of the first and second magnetic coil layers. The method also includes the steps of forming an insulating layer between the first magnetic coil layer and the magnetic core layer and between the magnetic core layer and the second magnetic core layer.

BRIEF DESCRIPTION OF THE DRAWINGS

In the figures, in which like reference characters indicate like parts:

FIGS. 4A, 4B, and 4C illustrate a top view, a longitudinal cross-sectional view, and a transverse cross-sectional view which illustrate a second step of an embodiment of a method for fabricating a thin film coil in accordance with the present invention.

FIGS. 5A, 5B, and 5C illustrate a top view, a longitudinal cross-sectional view, and a transverse cross-sectional view which illustrate a third step of an embodiment of a method for fabricating a thin film coil in accordance with the present invention.

DETAILED DESCRIPTION OF THE PREFERRED EMBODIMENT

Figure 1:
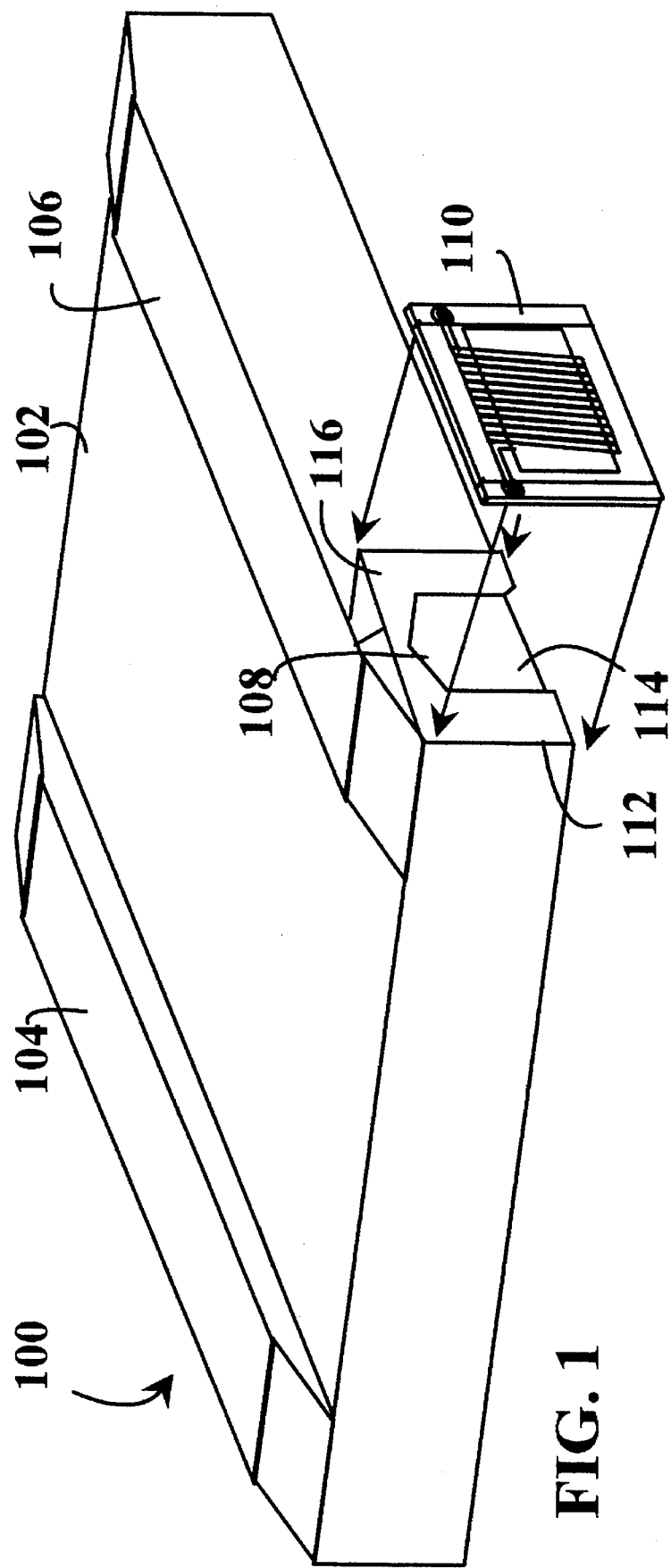
FIG. 1 is a perspective view of an embodiment of a thin film magnetic recording head including a thin film magnetic coil core in accordance with the present invention.

Referring to FIG. 1, there is shown a magnetic head 100 including a slider 102 constructed from non-magnetic materials and having a generally parallelpiped form and elongated floatation rails 104 and 106 which are parallel and attached to opposite sides of the quadrilateral slider 102. A mounting basin 108 is cut into a side of the quadrilateral slider 102 adjacent to floatation rail 106 and a magnetic head core 112 is glued to the slider 102 at the mounting basin 108. The magnetic head core 112 includes a first core section 114 and a second core section 116 forming a U-shaped core and gap which are mutually affixed using glass bonding. A magnetic recording head assembly 110 is affixed to the magnetic head core 112.

Figure 2:
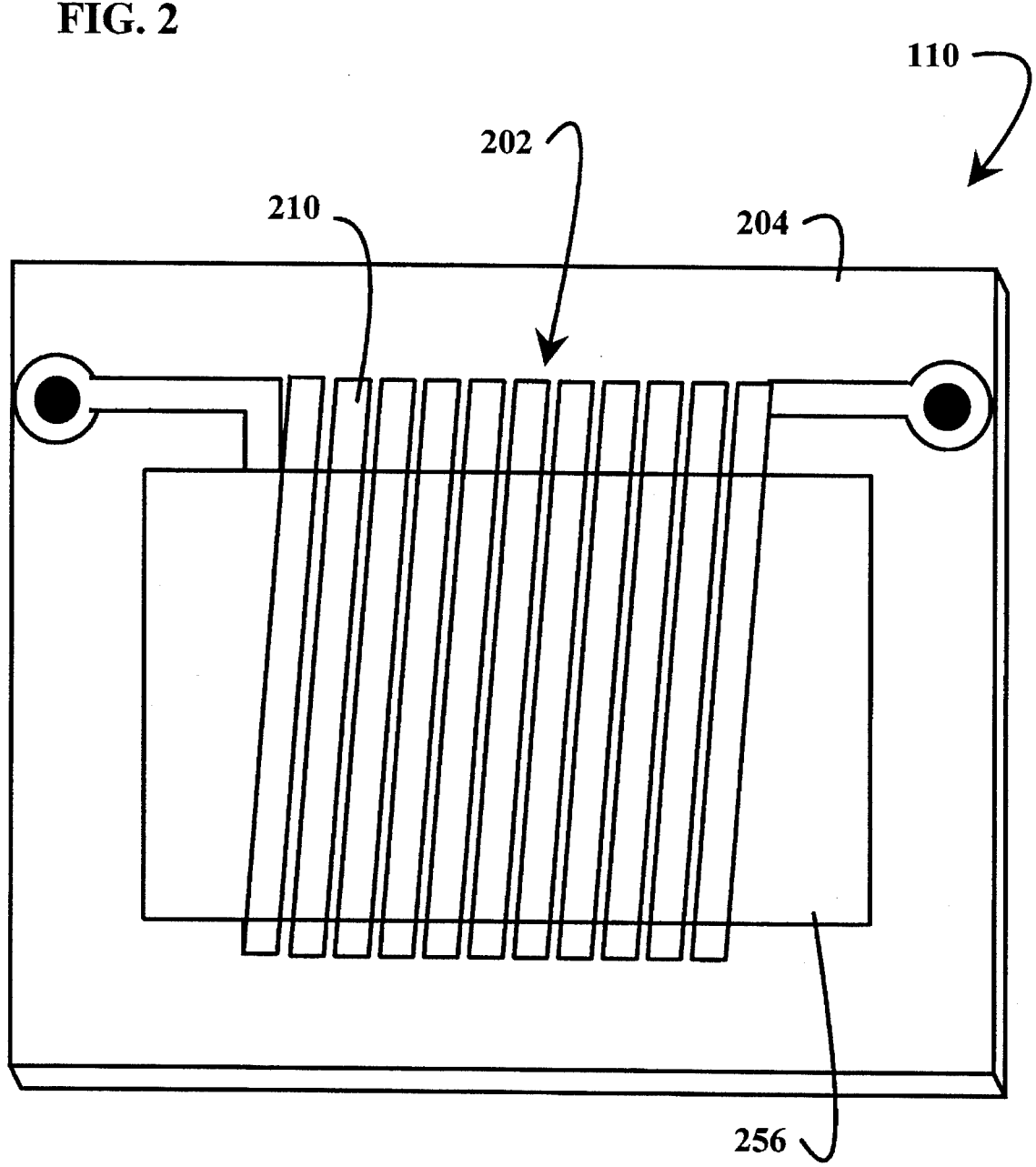
FIG. 2 is a perspective view of a thin film magnetic coil core, also called a thin film magnetic transductor, transductor of the recording head shown in FIG. 1.

Referring to FIG. 2, a magnetic recording head assembly 110 includes a magnetic transductor 202 and a substrate 204 for holding the magnetic transductor 202. The magnetic transductor 202 includes a magnetic core 256 carrying several windings or coil elements 210. The magnetic flux density generated by the magnetic transductor 202 is controlled by applying an alternating current to the coil elements 210. Coil elements 210 are formed generally in the shape of a helix.

Figure 3A:
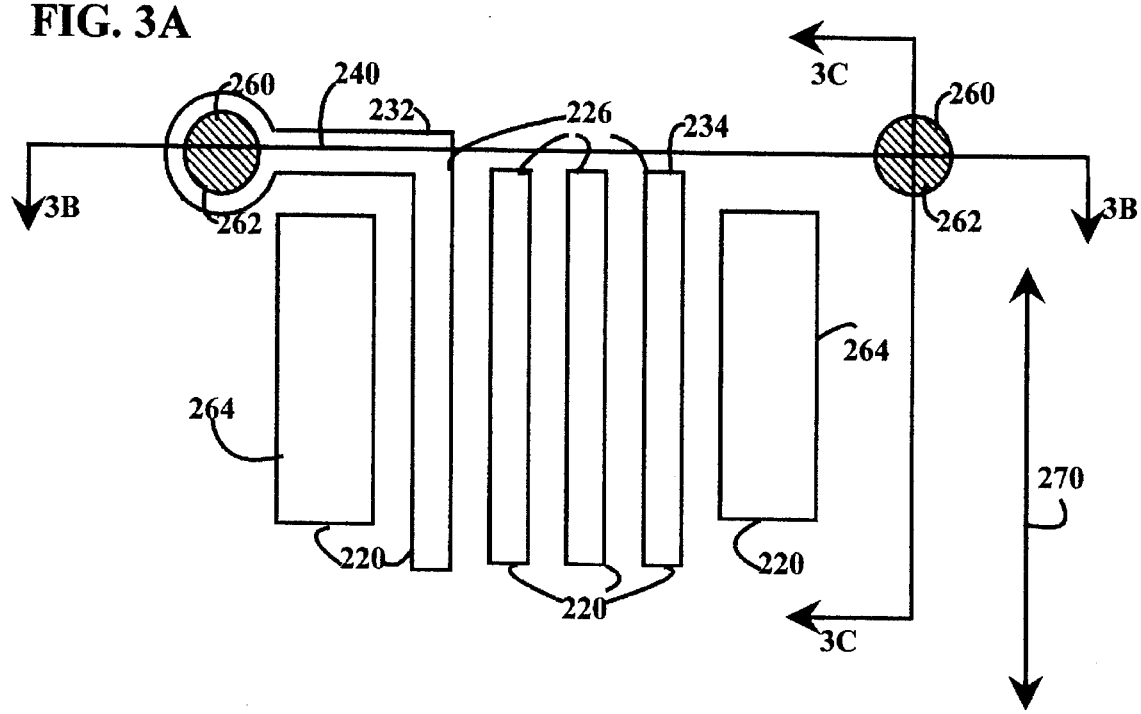
FIGS. 3A, 3B, and 3C illustrate a top view, a longitudinal cross-sectional view, and a transverse cross-sectional view which illustrate a first step of an embodiment of a method for fabricating a thin film coil in accordance with the present invention.
Figure 3B:
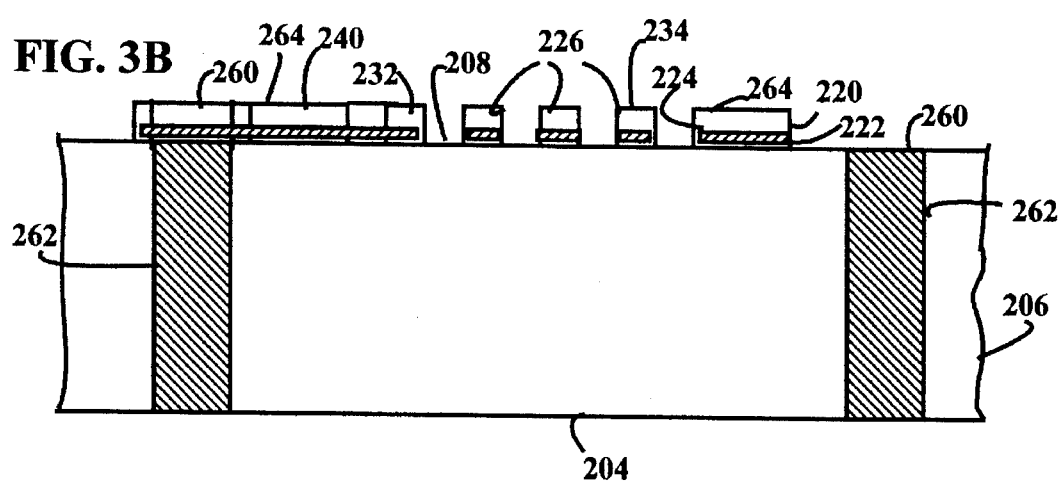
Figure 3C:
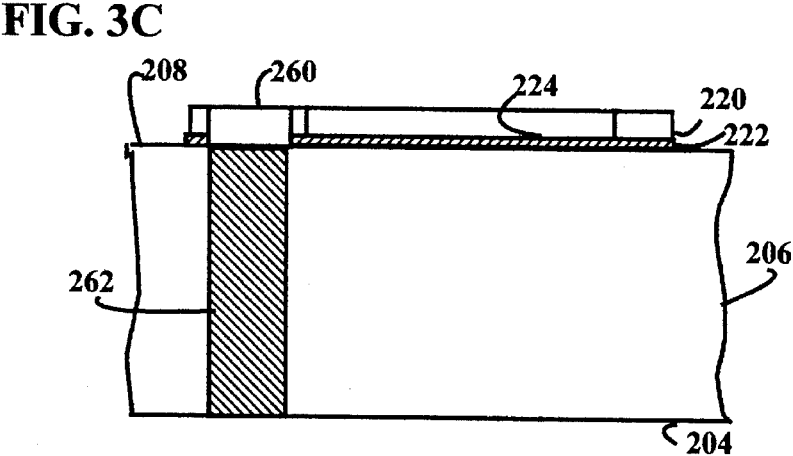

The structure and method of fabricating the magnetic recording head assembly 110 are depicted in FIGS. 3A–3C through 6A–6C. Referring to FIGS. 3A–3C, ceramic block substrate 204 is constructed from an alumina (aluminum oxide) wafer 206 having a thickness of approximately 25 mil and a diameter of 150 mm. A substrate wafer having these dimensions conforms to semiconductor processing standards, thereby facilitating processing using standard semiconductor fabrication equipment. A 150 mm diameter alumina wafer 206 can yield 25,000 thin film magnetic recording head assemblies.

Multiple deep vertical via holes 260 are formed in the ceramic block substrate 204 using a laser machining procedure.

Via holes 260 are filled with metal to form metal vias 262, which are used to furnish a conductive path laterally across the substrate 204. A metal contact material is filled into the via holes 260 to form multiple conductive metal vias 262. For example, either a plated copper or a sintered thick-film copper tungsten is formed in the via holes 260. However, other metals, such as gold, may be used to form the metal vias. Any suitable metal for forming a conductive path is appropriate. Metal vias 262 are formed by deposition of a metal into the vertical or near-vertical via holes 260 to construct a solid metal plug.

A first layer of the coil 220 is formed on the surface of the ceramic block substrate 204 using an electroplating method. The electroplating procedure includes the steps of sputter-depositing a seed layer 222, patterning the seed layer 222, forming the first coil layer 220 by electroplating and chemically etching away the seed layer 222. Electroplating is accomplished by first sputter-depositing a plating base seed layer 222, for example a chrome copper film, on a substrate frontside surface 208. The base seed layer depth is suitably thin, but sufficiently thick, so that conductivity for electroplating is established. The seed layer 222 is formed, for example, by sputter depositing a layer of chrome (not shown) on the substrate surface to a depth of approximately 300 Å to 500 Å, for example. A copper layer 224, which forms a second tier of seed layer 222, is sputter deposited overlying the chrome deposition to a depth of approximately 1000 Å. The seed layer 222 is patterned using conventional photolithographic techniques. First coil layer 220 is then formed by electroplating, using electrolysis to apply metal to the surface of the substrate frontside surface 208 in the regions of the surface 208 that overlie the seed layer 222.

After the first coil layer 220 is formed, the exposed portions of seed layer 222 are removed by chemical etching so that elements of the first coil layer 220 sit discretely in electrical isolation upon the surface 208 of the insulating substrate 204. For a chrome copper coil, chemical etching is achieved using a chrome etchant solution of 80 gm potassium permanganate and 20 gm potassium hydroxide dissolved in 1 liter of water and a copper etchant solution of 260 gm ammonium persulfate and 190 milliliters of 30% ammonium hydroxide dissolved in 3 liters of water.

Wet etching processes are associated with the various deposition steps of the illustrative fabrication method, including multiple electroplating steps. A wet etching process utilizes liquids, such as acids and other corrosive chemicals, as an etching agent. Etching proceeds through chemical reactions at the surface of a material. An additive electroplating fabrication process includes substantially fewer processing steps than a sputtering deposition operation which is associated with dry etching. Thus the electroplating and wet etch processes, in combination, reduce the cycle time of the fabrication process. In addition, circuits fabricated using electroplating and wet etching processes have shown an improvement in performance over devices fabricated using sputtering and dry etch processing of magnetic recording heads.

The electroplating process substantially improves the cycle time for fabricating the thick metal films in comparison to conventional deposition by sputtering in argon gas and etching by ion-beam milling using a photoresist mask.

The first coil layer 220 is thus patterned, plated and chemically etched using conventional photolithographic techniques to form a fine pattern of mutually parallel lines 226 on the surface 208 of the ceramic block substrate 204. In one embodiment, the coil elements 210 is formed in forty parallel lines 226, each line having a length of approximately 230 microns and a width of about five microns with the lines separated by two micron gaps. The forty parallel coil lines 226 are parallel to an axis called an "easy axis". The term "easy axis" refers to the directionality of the magnetic field generated by the subsequently-formed magnetic transductor 202 which is depicted in FIGS. 4A–4C through 6A–6C. The easy axis 270 is aligned orthogonal to the direction of the magnetic flux density of the magnetic transductor 202.

A first coil line 232 is shown extended at one end in a direction orthogonal to the parallel coil lines 226 to form a lead line 240. Depending on the location of the contact vias 262, the lead line 240 may disposed at an angle different from orthogonal with respect to the coils lines. Thus, the lead line 240 is shown to be disposed parallel to a second axis, called a "hard axis", which is orthogonal to the easy axis 270.

In addition to the coil lines 226, the electroplating process is used to form two leveling blocks 264 on each lateral side of the parallel coil lines 226. The leveling blocks 264 are rectangular in shape, having a length of approximately 200 microns and a width of about 100 microns. The leveling blocks 264 are formed parallel to the coil lines and easy axis 270 and each have a medial edge which is about 5 microns from the lateral edge of the outermost coil lines 232 and 234.

Leveling blocks 264 are used to support structures which are subsequently formed overlying the first coil layer 220. Leveling blocks 264 also serve to level the substrate surface 208. The usage of leveling blocks 264 for support avoids utilization of side poles. In this particular electroplated structure, bulky side poles are not desirable. Leveling blocks 264 are formed as part of the first coil layer 220 to achieve a level structure without performing an additional processing step.

Referring to FIGS. 4A–4C, a first insulating layer 280 is formed overlying the first coil layer 220 to electrically isolate the first coil layer 220 from a magnetic core 256 which is subsequently formed overlying the first coil layer 220. The first insulating layer 280 is constructed from a suitable insulating material such as photoresist material or a form of silicon oxide (such as silicon dioxide or silicon monoxide. For example, an electron-beam cured photoresist, such as AZ4620 photoresist, may be utilized for the first insulating layer 280. AZ4620 photoresist is a relatively thick photoresist material which deposits in a thick layer to suitably cover the topography of the substrate surface. The photoresist layer is electron beam cured for a period of approximately fifteen minutes, greatly reducing the time of curing in comparison to the more commonly used curing method of hard baking. In addition, electron beam curing causes very little change in the surface profile of the resist from running or flowing so that a preferable level surface is attained following curing of the photoresist layer. During the electron beam curing process, the cross sectional profile of the resist layer does not change appreciably due to running or flowing of the photoresist.

The first insulating layer 280 is a laminar structure which is formed by a single laminar deposition and curing step. The first insulating layer 280 is patterned so that a square or rectangular surface area is covered, overlying the first coil layer 220 including the parallel coil lines 226 and extending in the direction of the hard axis 272 between medial edges 266 of respective leveling blocks 264. The leveling blocks 264 are not covered by the first insulating layer 280. The first insulating layer 280 is patterned so that first ends 236 and second ends 237 of each parallel coil line 226 are left uncovered by the insulating layer 280. The photoresist is initially patterned in a suitable form by exposure through a photomask. Approximately a five micron square at the ends 236 and 237 of the coil lines 226 are left exposed, thereby forming a plurality of coil vias 238 at the ends 236 and 237 of the coil lines 226.

The magnetic core 256 is formed overlying the first insulating layer 280 to cover a substantially rectangular surface 274. The magnetic core 256 has a length extending in the direction of the hard axis 272 which is suitable for overlying the first coil layer 220 and first insulating layer 280 including the parallel coil lines 226 and extending beyond the lateral edges 266 of the leveling blocks 264. The width of the magnetic core 256 extends in the direction of the easy axis 270 only as far as the edge of the first insulating layer 280 so that the ends of the coil lines 226 in the first coil line layer 220 are left exposed. The magnetic core 256 is a nickel-iron (NiFe) permalloy deposition which is electroplated in the manner used to deposit the first coil layer 220. For example, a chrome copper seed layer 282 is deposited. A NiFe layer 284 is then patterned and plated onto the seed layer 282. The seed layer is then etched away. NiFe forms a soft and compliant magnetic material electroplated layer having a suitably flat surface.

The compliant nature of the NiFe magnetic core material decreases the reluctance of the magnetic path and thereby increases the efficiency of the magnetic recording head assembly 110. The NiFe permalloy has approximately an 80% nickel and 20% iron composition and a magnetically anisotropic magnetic core structure is formed by applying a magnetic anisotropy to the core 256 in a direction parallel to a hard axis 272 direction. Deviations from a perfectly flat surface are generally caused by the finite thickness of the first insulating layer 280. Although a perfectly flat magnetic coil 256 surface is theoretically ideal for magnetic performance and such a surface form is achievable through additional selective plating of the first coil layer 220, the degree of improvement in performance is not deemed sufficient to justify the additional processing. In other thin film magnetic core 256 embodiments, such additional processing may be justified by increased magnetic performance.

Referring to FIGS. 5A–5C, a second insulating layer 290 is formed overlying the magnetic core 256 to electrically isolate the magnetic core 256 from a second coil layer 212 which is subsequently formed overlying the magnetic core 256. The second insulating layer 290 is constructed from a suitable insulating material and, in this illustrative embodiment, is constructed from the same electron beam-cured AZ4620 photoresist used to construct the first insulating layer 280. The second insulating layer 290 is patterned into a rectangular or square surface 292 which overlies a central portion of the magnetic core 256 including an area overlying the first insulating layer 280. The second insulating layer 290 is patterned so that approximately a five micron square area at the ends of the parallel coil lines 226 are left exposed, thereby extending the coil vias 238 vertically at ends 236 and 237 of each coil line 226.

A second layer of the coil 212 is then formed on the surface of the second insulating layer 290. The second coil layer 212 is formed in a similar manner to the procedure for constructing the first coil layer 220. However, the first coil layer 220 is efficiently constructed using only a single mask since the entire coil is formed on a substantially level plane. In contrast, the second coil layer 212 is not formed on a level surface so that, in the illustrative embodiment of the fabrication method, multiple masks are utilized in the photolithographic procedure prior to electroplating for constructing the second coil layer 212. An appropriate amount of exposure varies in different regions of the coil surface area. Thus, the time of exposure varies in these different regions. A series of masks is utilized to achieve these variations in exposure time. In the illustrative embodiment of the fabrication method, three masks (not shown) are used to form the second coil layer 212.

The electroplating process for constructing second coil layer 212 includes forming of a chrome copper plating base seed layer 214. A layer of chrome and then a layer of copper 216 are sputter deposited overlying the second insulating layer 290. The second coil layer 212 is patterned using a first mask (not shown) of multiple masks. The first mask is a main mask which generally patterns the coil segments. The coil second layer 212 is formed into parallel lines 218, which are shown as four parallel lines for illustrative purposes but may be a larger number such as forty with all coil lines extending from a first end 246 to a second end 248 at a slight angle with respect to the easy axis 270. The parallel second layer coil lines 218 are not aligned in parallel with the first layer coil lines 226 but are offset from the first layer coil lines 226. Thus, the first end 246 of a first second-layer coil line 242 directly overlies the first end 236 of the first first-layer coil line 232. However the second end 248 of the first second-layer coil line 246 directly overlies the second end 237 of a second first-layer coil line 233, which is adjacent to the first first-layer coil line 232. The coil second layer 212 is deposited onto the ends 236 and 237 of the first layer coil lines 220. In this manner, the coil layers 220 and 212, which are each confined to a planar layer on a surface of the wafer combine to form a generally helical structure.

After the seed layer 214 of the second coil layer 212 is patterned, a second mask is used to clean out the "foot region" overlying the ends of the first layer coil lines where the second coil layer 212 makes contact with the first coil layer 220. Note that, prior to the application of the second mask, these foot regions are generally unobstructed since the intervening insulating layers 280 and 290 are in the form of rectangular layers which do not extend laterally to the ends of the coil lines but rather expose the ends of the coil lines of the first coil layer 220. The second coil layer 212 is formed by electroplating and includes a plurality of coil lines that extend laterally across the surface of the second insulating layer 290 but also includes vertical segments extending from the ends of the second layer coil lines to the ends of the first layer coil lines 220. Thus the laterally-extending first layer coil lines 220 and the laterally-extending second layer coil lines 212 are connected by the vertical segments of the second layer coil lines 212 to complete a coil structure traversing about the magnetic core 256.

A third mask is applied which covers the entire area of the coil region up to the edge of the insulating layer. Using the three masks for forming the second coil layer 212, photoetching exposure times are adjusted to suitably control the shape and thickness of the coil structure.

Figure 6A:
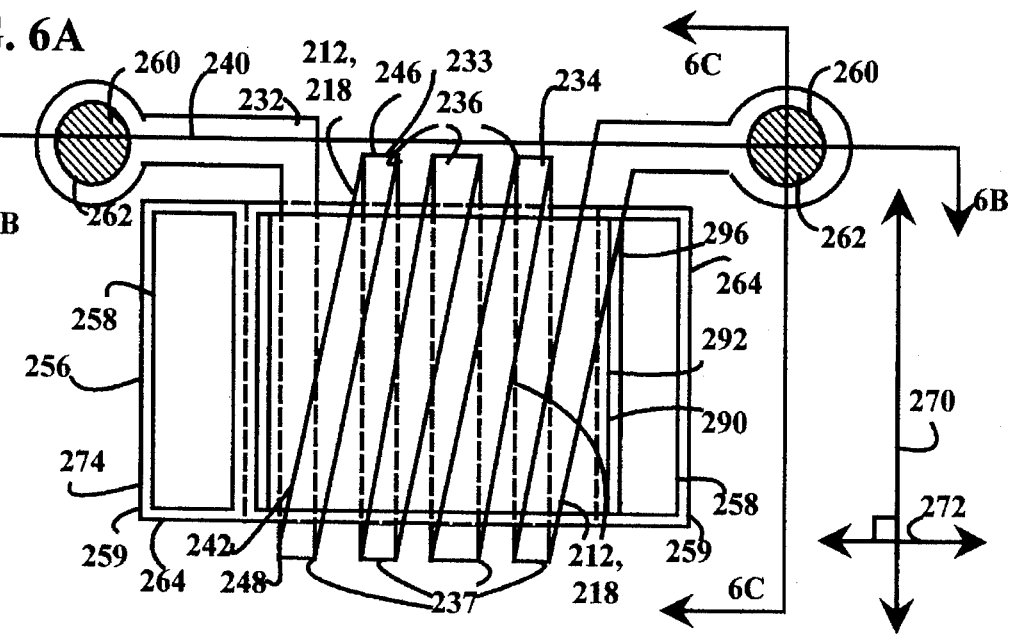
FIGS. 6A, 6B, and 6C illustrate a top view, a longitudinal cross-sectional view, and a transverse cross-sectional view which illustrate a fourth step of an embodiment of a method for fabricating a thin film coil in accordance with the present invention.
Figure 6B:
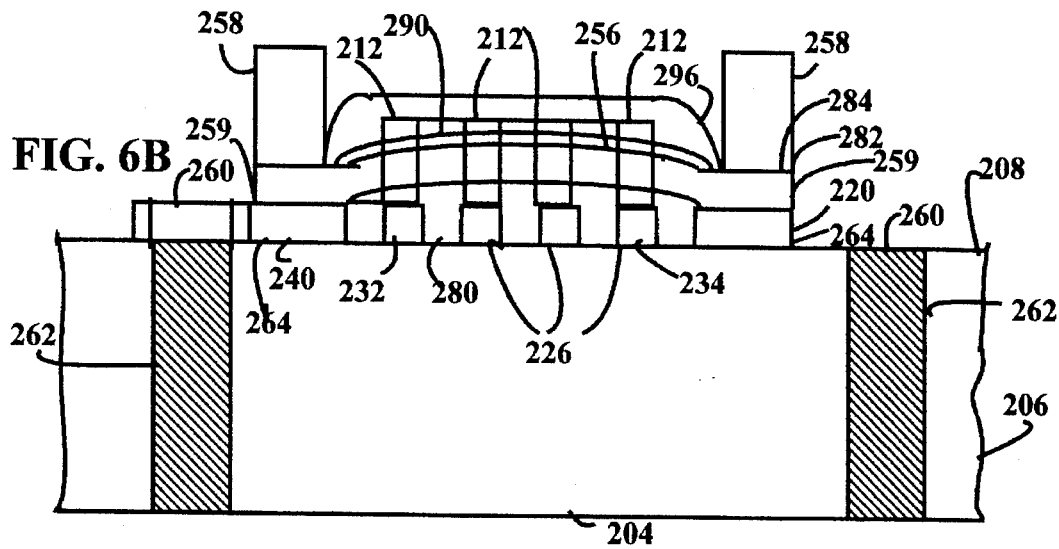
Figure 6C:
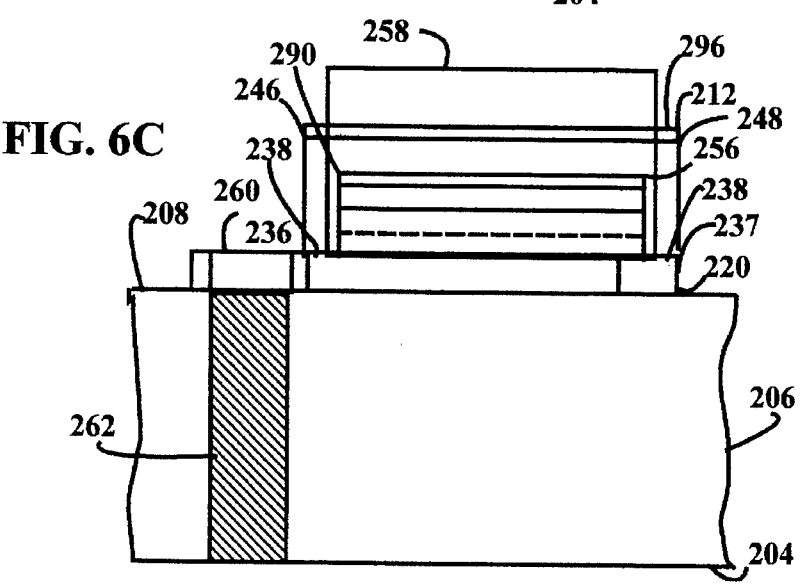

Referring to FIGS. 6A–6C, a third insulating layer 296 is deposited overlying the surface 208 which includes the second layer coil lines 220, the second insulating layer 290 and the magnetic core 256.

Core layer support structures 258 are formed as extensions of the magnetic core 256 on the lateral edges 259 of the magnetic core 256. The core layer support structures 258 are not overlaid by the second layer coil lines 220 and the second 290 and third 296 insulating layers. Thus the core layer support structures 258 are formed overlying each of the leveling blocks 264. Like the magnetic core 256, the core layer support structures 258 are a nickel-iron (NiFe) permalloy deposition which are electroplated in the manner used to deposit the first 220 and second 212 coil layers. The core layer support structures 258 are formed in various shapes, such as rectangular blocks, cubes, elongated cubes or cylindrical columns, for example, on the sides of the magnetic core 256 lateral to the group of parallel first 226 and second-layer 218 coil lines. The core layer support structures 258 are used to support structures overlying the thin film coil.

The ceramic block substrate 204 and metal via 262 structure is ground on the backside to remove approximately 0.25 mm to 0.38 mm, leaving a thickness of the ceramic block substrate 204 of approximately 0.13 mm to 0.25 mm of which the insulating and metal layers utilize approximately 20 microns of depth. The ceramic block substrate 204 is then sawed into individual thin film coil chips.

While the invention has been described with reference to various embodiments, it will be understood that these embodiments are illustrative and that the scope of the invention is not limited to them. Variations, modifications, additions and improvements of the embodiments described are possible.

For example, the number of turns in the coil is specified for illustrative purposes only. Any suitable number of coils is expressly within the scope of the invention. Furthermore, the coil layers may be patterned in various forms other than in parallel lines.

Additionally, various electroplating methods may be utilized to form metal layers. Furthermore, various suitable conductive metals such as copper, chrome copper, gold may be used for coil layers. Metal vias may be constructed from molybdenum as well as plated copper, sintered thick-film copper tungsten or thick-film gold. Magnetic materials for the magnetic core layer may be constructed from nickel-iron-cobalt (NiFeCo) as well as NiFe. Furthermore, various wet etchants may be used for forming via holes and to pattern the surface layers. The designated thicknesses of the various layers are presented for illustrative purposes only and are not limiting. Any suitable layer thicknesses, as known in the art of semiconductor fabrication, are within the scope of the invention. These and other variations, modifications, additions and improvements may fall within the scope of the invention as defined in the claims which follow.

What is claimed is:

1. A thin film conductor coil assembly comprising:

a ceramic substrate having a substantially planar first surface and an opposing second surface;

a plurality of conductive material filled vias passing from the first surface to the second surface of the ceramic substrate to form a conducting pathway across the ceramic substrate;

a first patterned coil layer formed on the substantially planar surface of the ceramic substrate, the first patterned coil layer including a plurality of mutually detached first coil layer elements, elements of the first coil layer having a first end and a second end;

a first insulating layer formed between the first coil layer elements and overlying the first coil layer elements, the first insulating layer being patterned so that the first and second ends of the first coil layer elements are exposed;

a magnetic core formed overlying the first insulating layer and insulated from the first patterned coil layer;

a second insulating layer formed overlying the magnetic core, the second insulating layer being patterned so that the first and second ends of the first coil layer elements are exposed; and a second patterned coil layer formed overlying the second insulating layer and insulated from the magnetic core by the second insulating layer, the second patterned coil layer including a plurality of mutually detached second coil layer elements, elements of the second coil layer having a first end coupled to the first end of a first element of the first coil layer elements and having a second end coupled to the second end of a second element of the first coil layer elements, the first and second elements of the first coil layer being different elements so that the first and second coil layer elements are coupled in an alternating sequence having a first end and a second end, the first and second ends of the alternating sequence being coupled to vias of the plurality of the conductive material filled vias.

2. A thin film conductor coil assembly according to claim 1 wherein the ceramic substrate is an alumina wafer.

3. A thin film conductor coil assembly according to claim 1 wherein:

the first coil layer elements substantially form a pattern of mutually parallel lines; and the second coil layer elements substantially form a pattern of mutually parallel lines corresponding in number to the first coil layer element lines, the second coil layer elements first and second ends being coupled to adjacent elements of the first coil layer.

4. A thin film conductor coil assembly according to claim 1 wherein the conductive material filled vias are filled with a metal selected from the group of electroplated copper, sintered thick-film copper tungsten and gold.

5. A thin film conductor coil assembly according to claim 1 wherein the magnetic core is an electroplated a nickel-iron (NiFe) permalloy.

6. A thin film conductor coil assembly according to claim 1 wherein the first and second coil layer elements coil is formed from an electroplated thin metal film.

7. A thin film conductor coil assembly according to claim 1 wherein the first and second coil layer elements coil is formed from an electroplated thin copper film.

8. A thin film conductor coil assembly according to claim 1 further comprising:

a plurality of leveling blocks coupled to the ceramic substrate and formed with the first patterned coil layer, the plurality of leveling blocks supporting the magnetic core.

9. A thin film conductor coil assembly comprising:

a substantially planar magnetic core;

an electroplated thin film conductor coil coiled about and enveloping the magnetic core, the thin film conductor coil including:

a first patterned coil layer formed from a plurality of mutually detached first coil layer elements having a first end and a second end, the first patterned coil layer being substantially planar in a plane parallel to the planar magnetic core;

a second patterned coil layer formed from a plurality of mutually detached substantially planar second coil layer elements in a plane substantially parallel to the planar magnetic core and separated from the first patterned coil layer plane by the planar magnetic core, elements of the second coil layer elements having a first end and a second end; and a plurality of coil segments coupling the first ends of elements of the first coil layer to the first ends of elements of the second coil layer and coupling the second ends of elements of the first coil layer to the second ends of elements of the second coil layer, the first coil layer elements being coupled to different second coil layer elements at the first and second ends so that the first and second coil layer elements are coupled in an alternating sequence having a first end and a second end;

an insulating layer formed about the magnetic core and between the coil segments, the second coil layer elements and the first coil layer elements so that the magnetic core and the coil layer elements and segments are mutually insulated;

a ceramic substrate coupled to the thin film conductor coil and having a substantially planar first surface and an opposing second surface; and a plurality of conductive material filled vias passing from the first surface to the second surface of the ceramic substrate to form a conducting pathway across the ceramic substrate, the vias being coupled to the first and second ends of the alternating sequence.

10. A thin film conductor coil assembly according to claim 9 wherein the ceramic substrate is an alumina wafer.

11. A thin film conductor coil assembly according to claim 9 wherein:

the first coil layer elements substantially form a pattern of mutually parallel lines; and the second coil layer elements substantially form a pattern of mutually parallel lines corresponding in number to the first coil layer element lines, the second coil layer elements first and second ends being coupled to adjacent elements of the first coil layer.

12. A thin film conductor coil assembly according to claim 9 wherein the conductive material filled vias are filled with a metal selected from the group of electroplated copper, sintered thick-film copper tungsten and gold.

13. A thin film conductor coil assembly according to claim 9 wherein the magnetic core is an electroplated a nickel-iron (NiFe) permalloy.

14. A thin film conductor coil assembly according to claim 9 wherein the first and second coil layer elements coil is formed from an electroplated thin metal film.

15. A thin film conductor coil assembly according to claim 9 wherein the first and second coil layer elements coil is formed from an electroplated thin copper film.

16. A thin film conductor coil assembly according to claim 1 further comprising:

a plurality of leveling blocks coupled to the ceramic substrate and formed with the first patterned coil layer, the plurality of leveling blocks supporting the magnetic core.

* * * * *